US007581024B1

(12) United States Patent
Yip et al.

(10) Patent No.: US 7,581,024 B1
(45) Date of Patent: Aug. 25, 2009

(54) METHOD AND SYSTEM FOR INCREASING PARTICIPATION IN A STANDBY ROUTER PROTOCOL

(75) Inventors: Michael Yip, Sunnyvale, CA (US); Apoorva Bhatt, Belmont, CA (US)

(73) Assignee: Extreme Networks, Santa Clara, CA (US)

( * ) Notice: Subject to any disclaimer, the term of this patent is extended or adjusted under 35 U.S.C. 154(b) by 1847 days.

(21) Appl. No.: 09/895,145

(22) Filed: Jun. 30, 2001

(51) Int. Cl.
*G06F 15/173* (2006.01)

(52) U.S. Cl. .................. 709/244; 709/208; 709/238; 370/395.53; 370/228

(58) Field of Classification Search .......... 709/226, 709/229, 244, 208, 238; 370/395.53, 228
See application file for complete search history.

(56) References Cited

U.S. PATENT DOCUMENTS

| 5,473,599 | A  | * | 12/1995 | Li et al. ............... 370/219 |
| 5,815,668 | A  | * | 9/1998  | Hashimoto ............ 709/238 |
| 6,751,191 | B1 | * | 6/2004  | Kanekar et al. ........ 370/217 |
| 6,810,037 | B1 | * | 10/2004 | Kalapathy et al. ...... 370/392 |
| 6,914,905 | B1 | * | 7/2005  | Yip et al. ............. 370/395.53 |
| 6,934,292 | B1 | * | 8/2005  | Ammitzboell ......... 370/395.53 |
| 6,954,436 | B1 | * | 10/2005 | Yip et al. ............. 709/238 |
| 7,120,154 | B2 | * | 10/2006 | Bavant et al. ......... 370/395.53 |
| 7,269,135 | B2 | * | 9/2007  | Frick et al. ........... 370/395.5 |

2001/0048661 A1 * 12/2001 Clear et al. ............. 370/218

OTHER PUBLICATIONS

NightFlight (Dec. 3, 2000). Protocol Data Unit. Retrieved Dec. 8, 2004 from , Free Online Dictionary of Computing Web site: http://www.nightflight.com/foldoc-bin/foldoc.cgi.*
Li, T (Mar. 1998). Cisco Hot Standby Router Protocol (HSRP). The Internet Society, .*
Extreme Neworks, "ExtremeWare Sorftware User Guide: Software Version 6.1", Apr. 2000, pp. 10-1 to 10-20 and pp. 11-11 to 11-15.*

* cited by examiner

*Primary Examiner*—Ramy Mohamed Osman
(74) *Attorney, Agent, or Firm*—Blakely, Sokoloff, Taylor & Zafman LLP (57) ABSTRACT

A method and system is provided for increasing participation in a standby router protocol (SRP) without increasing the amount of network traffic due to SRP messaging. One or more domain master VLANs participate in an SRP on behalf of numerous member VLANs belonging to the domain master VLAN's domain. The domain master VLANs are associated with at least one virtual router. Each domain member VLAN follows the current default routing configuration for the domain master VLAN as determined in accordance with the SRP election process defined for that virtual router. An end-host attached to a host-specific port on an SRP router participates in the SRP by using a router bridge connection established between the SRP router and other SRP routers supporting the virtual router. Each end-host on a host-specific port follows the current default routing configuration implemented by the current master SRP router as determined in accordance with the SRP election process defined for that virtual router.

17 Claims, 6 Drawing Sheets

METHOD AND SYSTEM FOR INCREASING PARTICIPATION IN A STANDBY ROUTER PROTOCOL

BACKGROUND OF THE INVENTION

1. Field of the Invention

The present invention relates to the field of network management technologies. In particular, the present invention relates to increasing the numbers of end-hosts that can participate in a standby router protocol.

2. Background Information and Description of Related Art

The use of standby routers in an Internet Protocol (IP) network is known in the art. The Internet Engineering Task Force (IETF) has published a draft standard protocol for using standby routers, also referred to as redundant routers, entitled *Virtual Router Redundancy Protocol*, version 2-05, on Jan. 5, 2000 (VRRP).

In a typical network configuration, end-hosts that are connected to a layer-2 domain communicate with other subnets through the use of a default router. Often, the default router is statically configured as it minimizes configuration and processing overhead on the end-host and is widely supported by most Internet Protocol (IP) networks. As noted by the IETF, one of the drawbacks of using a statically configured default router is that it creates a single point of failure. Therefore, loss of the default router results in a catastrophic event, isolating all end-hosts that are unable to detect any alternate path that may be available. The use of standby routers, also referred to as redundant routers, eliminates the single point of failure inherent in the static default routed environment. (VRRP, Section 1, Introduction).

Protocols for using standby routers involve the notion of a virtual router. A virtual router is an abstract object managed by a standby router protocol (SRP), and it functions as a default router for end-hosts on a network. The virtual router is defined by a Virtual Router Identifier (VRID) and a set of associated IP addresses. The virtual router may be implemented with two or more routers running the SRP. The SRP specifies an election process whereby the responsibility for forwarding packets sent to the IP address(es) associated with the virtual router is dynamically assigned to one of the SRP routers, called the master. The remaining SRP routers are variously referred to as standby, backup, or slave routers, and are available to assume forwarding responsibility for a virtual router should the current master fail.

Figure 1A:
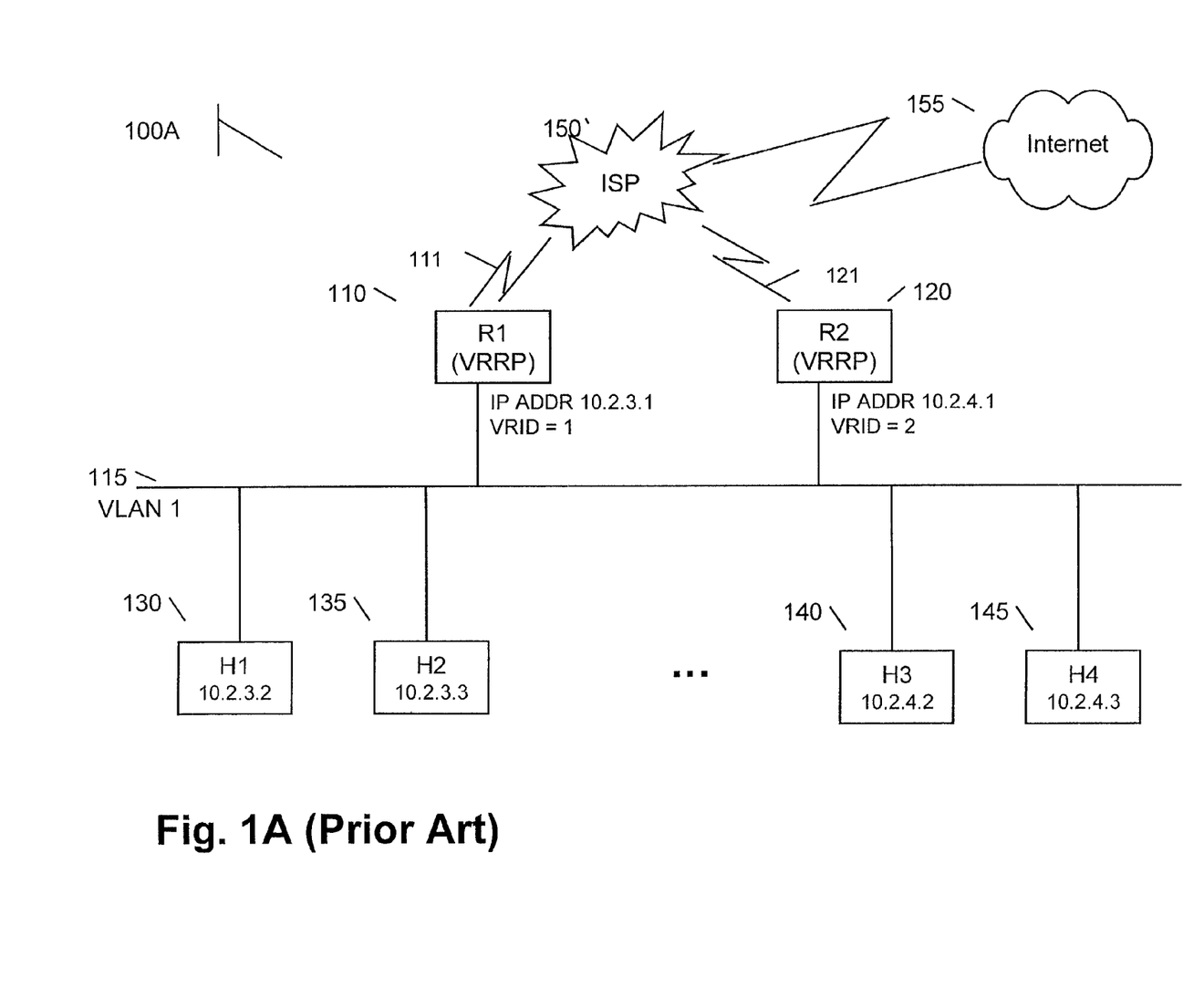
FIG. 1A illustrates a block diagram of a typical prior art network configuration using the virtual redundant router protocol (VRRP)

FIG. 1A is a block diagram that illustrates a typical prior art network configuration using the IETF VRRP. As illustrated, routers R1 110 and R2 120 are defined as VRRP routers connected to a virtual local area network VLAN1 115 supporting virtual routers VRID1 and VRID2. VRID1 is defined as the virtual router associated with IP subnet 10.2.3.1, and VRD2 is defined as the virtual router associated with IP subnet 10.2.4.1. Hosts H1 130 and H2 135 have configured a static default route through R1's IP address 10.2.3.1, and hosts H3 140 and H4 145 have configured a static default route through R2's IP address 10.2.4.1. R1 110 is the initial master for VRID1 and R2 120 is the backup (slave) router. Likewise, R2 is the initial master for VRID2 and R1 is the backup (slave) router. Thus, if R1 110 fails such as when the R1 ISP 150 connection 111 to the Internet 155 goes down, then R2 120 is elected the new master VRRP router for VRID1, and publishes the new subnet route 10.2.4.1 for hosts H1 130 and H2 135. Likewise, if R2 120 fails (e.g. the connection 121 to the Internet 155 goes down), then R1 110 is elected the new master VRRP router for VRID2, and publishes the new subnet route 10.2.3.1 for hosts H3 140 and H4 145. The election of the new master VRRP router is performed in accordance with the election process defined for the IETF VRRP protocol.

One of the drawbacks to implementing an SRP is that the SRP messaging that is necessary to support the election process generates a significant amount of network traffic. SRP messaging is performed using Internet Protocol (IP) multicast datagrams, specifically referred to as SRP packet datagram units (PDUs). Each end-host, subnet or any layer-2 domain participating in the SRP must send a PDU containing information about their status to the two or more routers running the SRP. If a large number of end-hosts, subnets, or layer-2 domains participate, the result is a periodic flooding of the network with SRP PDUs to and from the SRP routers.

Figure 1B:
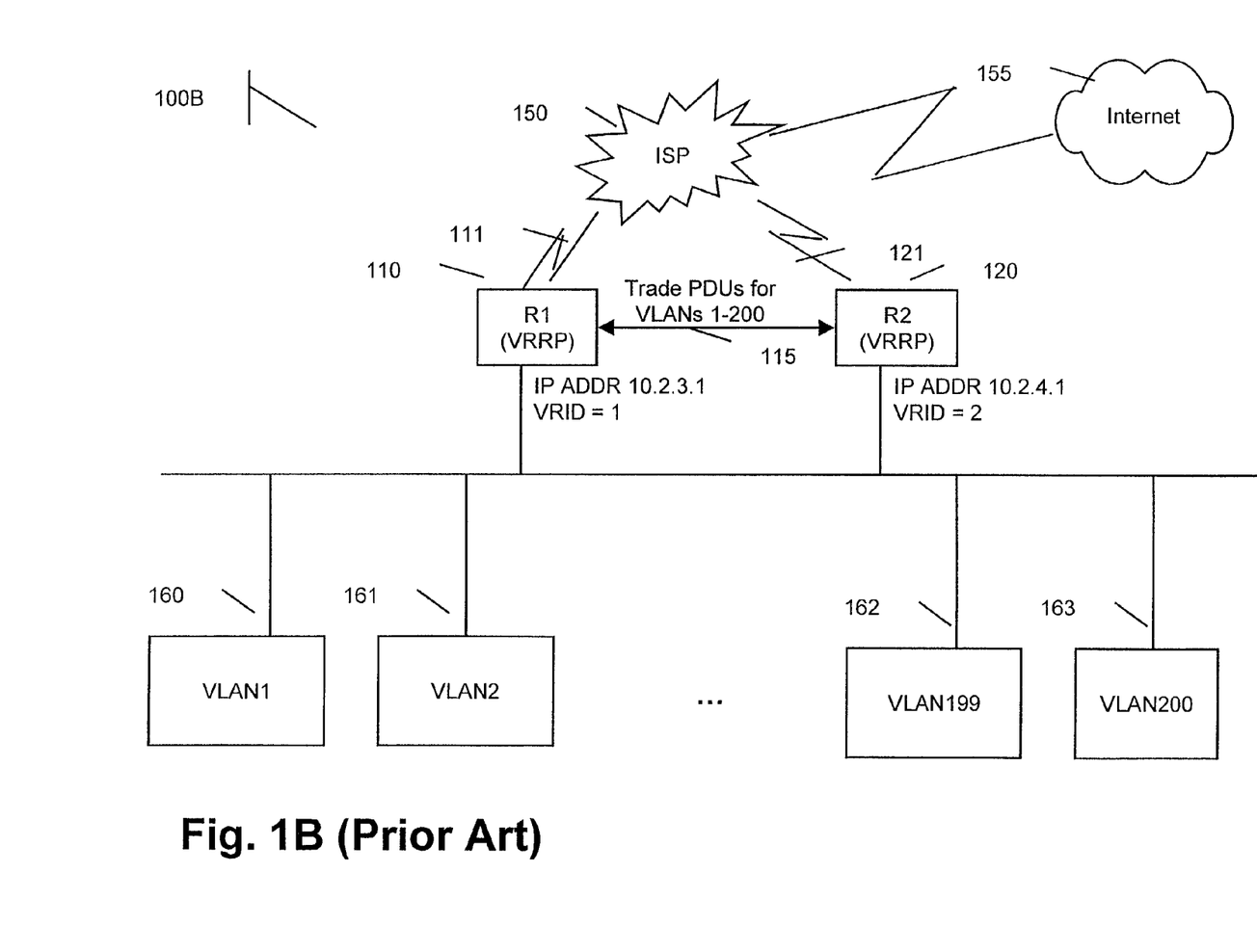
FIG. 1B illustrates a block diagram of prior art network of FIG. 1A with 200 VLANs participating in the VRRP.

FIG. 1B is a block diagram that illustrates a typical prior art network configuration similar to that illustrated in FIG. 1A, but with 200 VLANs 160, 161, 162, and 163 participating in the VRRP instead of a single VLAN1 115. Because the router R1 110 and R2 120 must exchange PDUs for all 200 VLANs over connection 115, the network can be overwhelmed. Nonetheless, all 200 VLANs must participate in the SRP in order to provide the benefits of dynamic failover that is critical to the support of a high level of uninterrupted service on a network. In some cases, it may be necessary to support thousands of VLANs or other layer-2 domains. It would be desirable, therefore, to devise a way to increase participation in an SRP without a concomitant increase in the amount of network traffic due to SRP messaging in order to provide scalability when implementing the SRP.

Another problem when implementing an SRP is that host-specific ports on the SRP routers running the SRP (i.e. the routers comprising the virtual router), are not utilized in a typical SRP routing configuration. Host-specific ports are generally used by a single end-host for which the port is specifically configured.

Figure 1C:
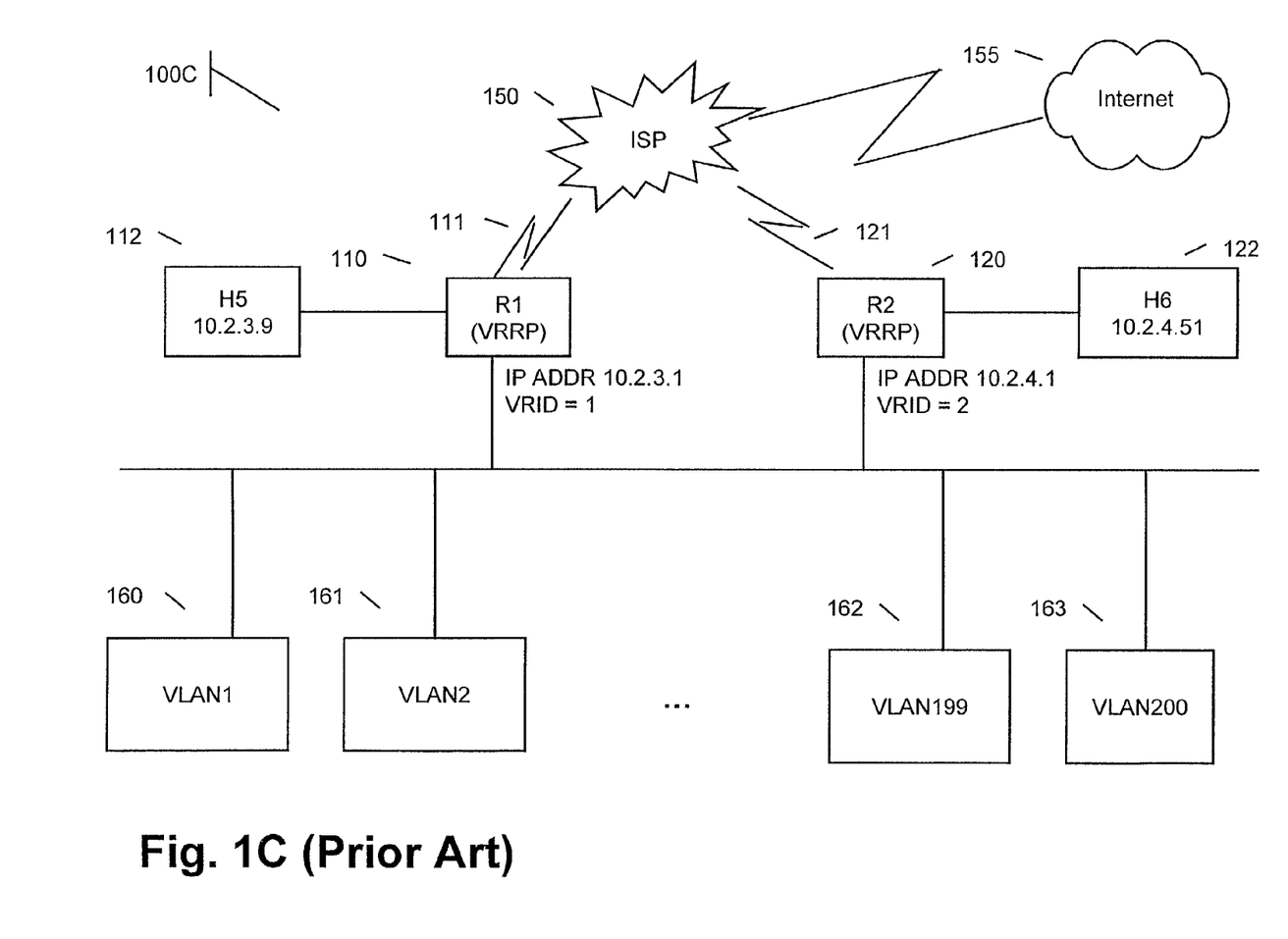
FIG. 1C illustrates a block diagram of prior art network of FIG. 1B with end-hosts connected to host-specific ports that are unable to participate in the VRRP.

FIG. 1C is a block diagram that illustrates a typical prior art network configuration similar to that illustrated in FIG. 1B. In addition to the ports that support the 200 VLANs 160, 161, 162, and 163 that participate in the VRRP, routers R1 110 and R2 120 include host-specific ports that support end-host H5 112 and end-host H6 122, respectively. Because routers R1 and R2 are the end-hosts' only connection to the rest of the network and the Internet, R1 and R2 are still a single point of failure for those end-hosts. As a result, when used at all, these host-specific ports end up being relegated to less critical end-hosts where the need for redundancy is not as imperative. It would be desirable, therefore, to devise a way to allow these under-utilized ports to participate in SRP.

SUMMARY

According to one aspect of the invention, a method and system is provided for increasing participation in a standby router protocol (SRP) without increasing the amount of network traffic due to SRP messaging. One or more domain master VLANs participate in an SRP on behalf of numerous member VLANs belonging to the domain master VLAN's domain. The domain master VLANs are associated with at least one virtual router. Each domain member VLAN follows the current default routing configuration for the domain master VLAN as determined in accordance with the SRP election process defined for that virtual router.

According to another aspect of the invention, an end-host attached to a host-specific port on an SRP router participates in the SRP by using a router bridge connection established between the SRP router and other SRP routers supporting the virtual router. Each end-host on a host-specific port follows the current default routing configuration implemented by the current master SRP router as determined in accordance with the SRP election process defined for that virtual router. In some instances, the current master router may be the same SRP router having a host-specific port to which the end-host is attached, and in other cases, the current master router may be a different router from the one having a host-specific port to which the end-host is attached.

In accordance with other aspects of the present invention, apparatus are provided for carrying out the above and other methods.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description various aspects of the present invention, a method for increasing participation in an SRP will be described. Specific details will be set forth in order to provide a thorough understanding of the present invention. However, it will be apparent to those skilled in the art that the present invention may be practiced with only some or all of the described aspects of the present invention, and with or without some or all of the specific details. In some instances, well known architectures, steps, and techniques have not been shown to avoid unnecessarily obscuring the present invention. For example, specific details are not provided as to whether the method and system is implemented in a router, server or gateway, as a software routine, hardware circuit, firmware, or a combination thereof.

Various operations will be described as multiple discrete steps performed in turn in a manner that is most helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 2:
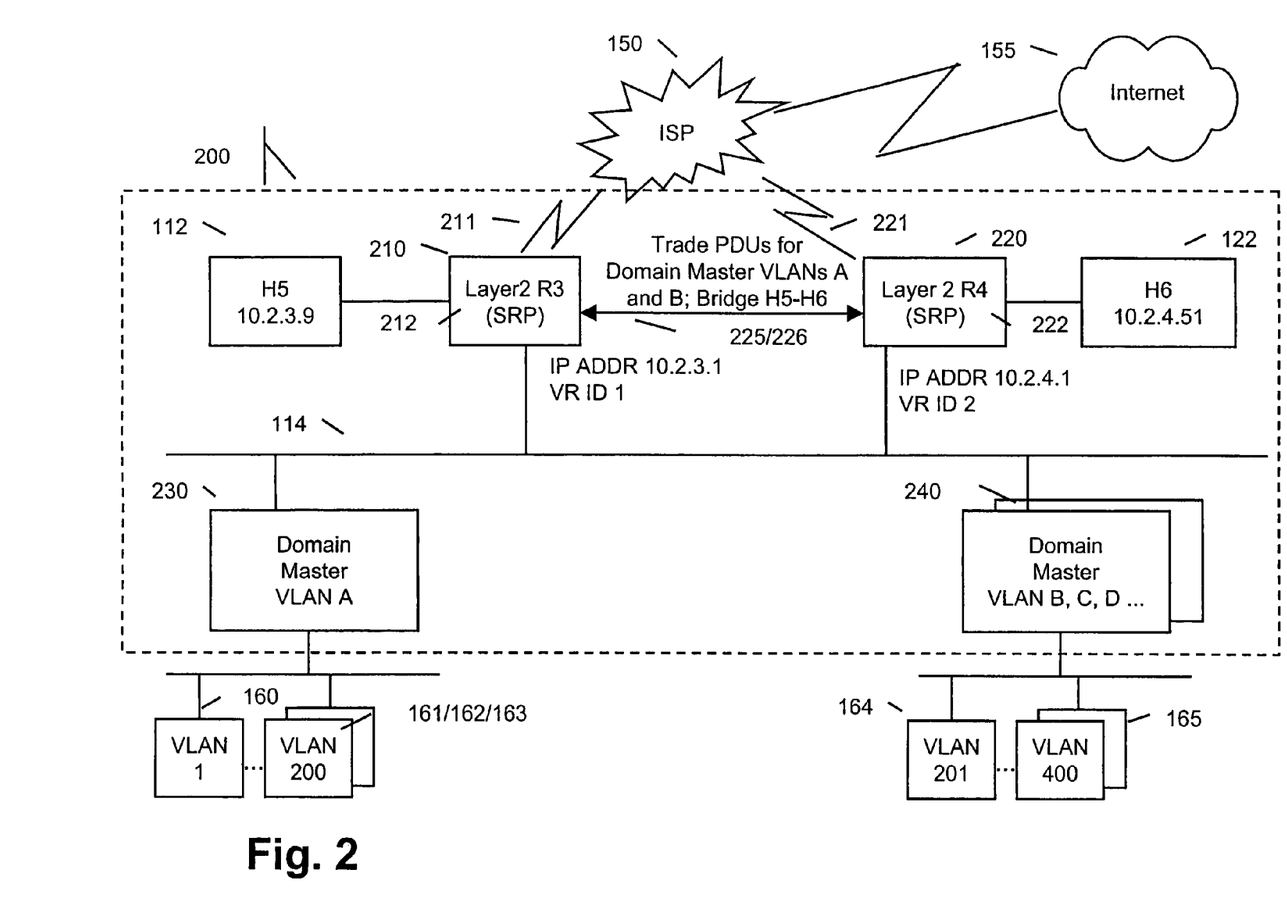
FIG. 2 illustrates a block diagram of a network configuration using a standby router protocol (SRP) in accordance with one embodiment of the present invention.

Referring now to FIG. 2, wherein a block diagram of a network configuration 200 using a standby router protocol (SRP) in accordance with one embodiment of the present invention is shown. As illustrated, routers R3 210 and R4 220 are defined as SRP routers connected to a local area network (LAN) 114 supporting virtual routers VRID1 and VRID2. As in FIGS. 1A-1C, VRID1 is defined as the virtual router associated with IP subnet 10.2.3, and VRD2 is defined as the virtual router associated with IP subnet 10.2.4. Each IP subnet may be configured as one or more virtual LAN (VLAN) domains such as Domain Master VLAN A 230 and Domain Master VLAN B 240. Layer-2 subnets such as VLANs 1-200 160/161/162/163 and VLANs 201-400 164/165 are configured as members of one of the VLAN domains and follow the default routing rules currently in place for their Domain Master VLAN. In one embodiment, Domain Master VLAN A 230 has configured a static default route through R3's IP address 10.2.3.1 and member VLANs 1-200 160/161/162/163 follow the default routing rules for Domain Master VLAN A 230. Similarly, Domain Master VLAN B 240, which has configured a static default route through R4's IP address 10.2.4.1 and member VLANs 201-400 164/165 follow the default routing rules for Domain Master VLAN B 240.

End-hosts H5 112 and H6 122 are each connected to a Host-Specific Port 212/222 on their respective SRP routers R3 210 and R4 220. End-host H5, having an IP address of 10.2.3.9, has configured a static default route through R3's IP address 10.2.3.1, and end-host H6, having an IP address of 10.2.4.51, has configured a static default route through R3's IP address 10.2.4.1. A bridge route 226 is defined between R3 210 and R4 220 to provide a redundant path via external connections 211/212 to the ISP 150 and the Internet 155. The current SRP master for a given virtual router, VRID 1 or VRID 2, serves as the default router for both of the end-hosts H5 112 and H6 122. In this way, if connection 211 on R3 210 goes down and R4 220 becomes the SRP master router, then end-host H5 may connect to ISP 150 via the bridge route 226 to SRP router R4 220 and connection 221. Similarly, if connection 221 on R4 220 goes down and R3 210 becomes the SRP master router, then end-host H6 122 may connect to ISP 150 via the bridge route 226 to SRP router R3 210 and connection 211. Without such redundancy, end-hosts H5 and H6 could become isolated from the outside network services of the ISP 150 and the Internet 155 should their static default router connection to ISP 150 go down.

Additional layer-2 subnets may be connected to Domain Masters VLAN C, D, etc. 240, with each Domain Master VLAN having configured a static default route through the SRP router R3, R4, or any other SRP router connected to network 114. In the illustrated embodiment, R3 210 is the initial master for VRID1 and R4 220 is the standby (backup or slave) router. Likewise, R4 220 is the initial master for VRID2 and R3 210 is the standby (backup or slave) router. Other initial master configurations may be employed without departing from the spirit of the invention.

Each router R3 210 and R4 220, is configured to run an SRP protocol in accordance with one embodiment of the invention. Although only two SRP routers are shown in the illustrated embodiment, additional SRP routers may be added to network 114 to increase the level of redundancy. In one embodiment each router is a switch that is physically connected to the same layer-2 domain and the rest of the network 114. Each switch is configured with the same subnet information of the Domain Master VLANs they are sharing so that either switch is capable of functioning as the default router for a given Domain Master VLAN 230/240 and their associated member VLANs 160-165. Initially, one switch will be elected as the master SRP router, and the other will be the standby (backup or slave) router. For example, with reference to the illustrated embodiment, R3 210 is the master SRP router for VRID1. As the master, R3 functions as the default router for the subnet 10.2.3 associated with hosts H1 and H2. It will handle all the data traffic for hosts H1 and H2 and export the subnet route for H1 and H2 to other routers. Likewise, R4 220 is the master SRP router for VRID2. Thus, both VRID1 and VRID2 are each served by a master and a standby (backup or slave) router.

In operation, R3 210 and R4 220 periodically trade SRP packet data units (PDUs) 225 with each other at specified time intervals. The SRP PDUs contain, among other items, data that reflect the SRP election algorithm parameters obtained from participating Domain Master VLANs A, B, C, D etc. 230/240 for the routers R3 and R4. The election algorithm parameter data is used by the election process to determine the new master router. One example of the type of data and election algorithms used to determine the new master is described in commonly assigned application Ser. No. 09/797,475, Method and Apparatus for Selecting Redundant Routers using Tracking. However, it should be noted that numerous other data and election algorithms may be employed without departing from the spirit of the invention.

If the SRP election algorithm parameter data for either of the SRP routers R3 210 and R4 220 indicate that a new master must be elected, than an election process elects the new master in accordance with the election algorithm for the SRP. For example, in one embodiment, R3 210 may be elected to assume the master router function for virtual router VRID2 serving subnet 10.2.4 and associated Domain Master VLANs A, B, C, D etc. An election process is performed, and upon election of R3 210 to be the master router for virtual router VRID2, R3 210 sends the new subnet route for end-hosts of the VLAN members 160-165 of Domain Master VLANs A, B, C, D etc. 230/240 to other routers on the network, and commences default routing. In this scenario, R3 210 will be the master for both virtual routers VRID1 and VRID2.

Figure 3:
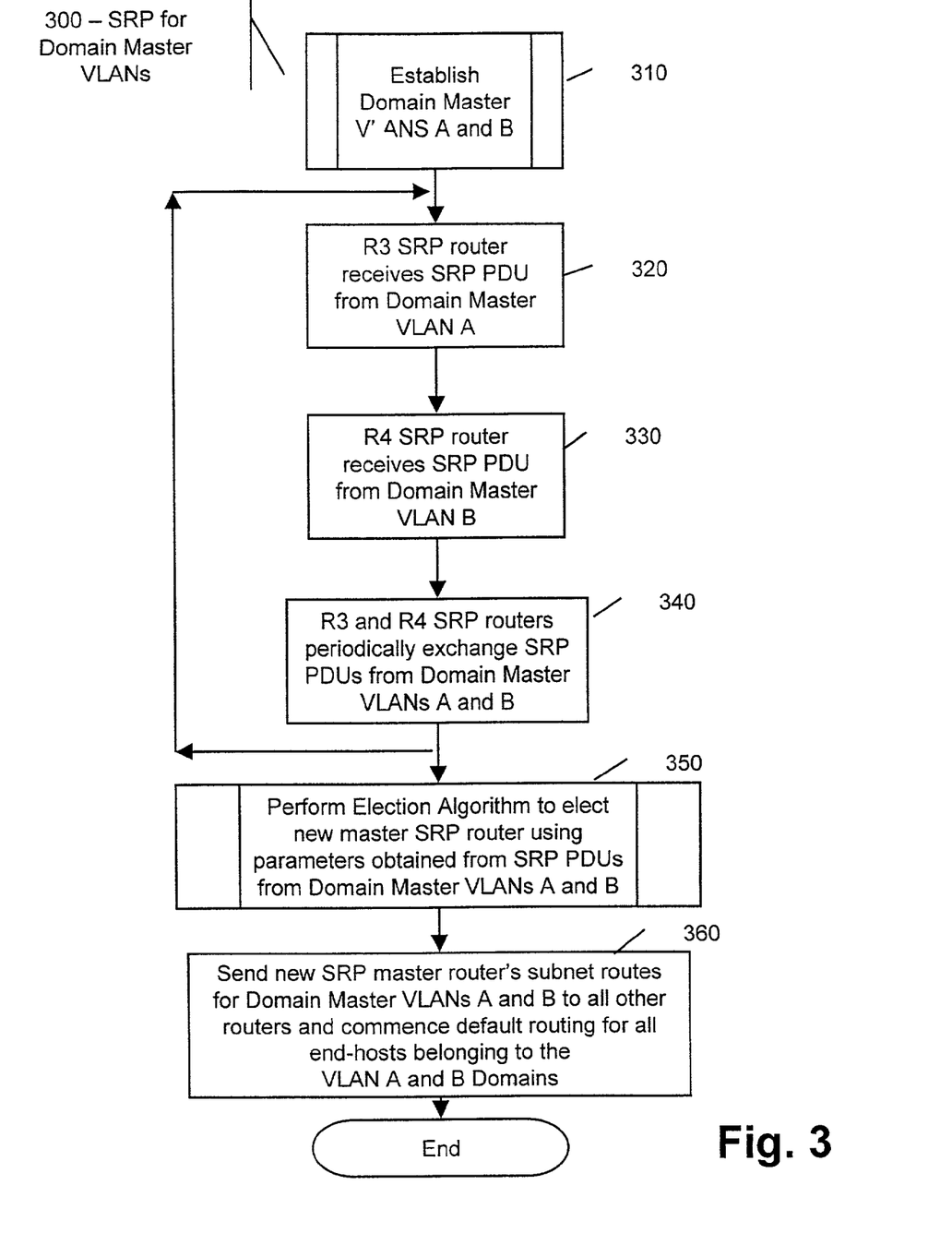
FIG. 3 illustrates a flow diagram of the participation in an SRP of a domain master VLAN in accordance with one embodiment of the present invention.

Referring now to FIG. 3, wherein a flow diagram of the participation in an SRP of a domain master VLAN 300 in accordance with one embodiment of the present invention is shown. As illustrated, in block 310, the network administrator establishes one or more Domain Master VLANS A and B (or C, D, etc.) as needed to support the end-hosts for which redundancy is desired. The R3 SRP router receives SRP PDUs from Domain Master VLAN A at block 320, and Domain Master VLAN B at block 330 and so forth until SRP PDUs are received from all participating Domain Master VLANs. At block 340, the R3 and R4 SRP routers, as well as any other SRP routers that are supporting the various virtual routers, e.g. VRID1 and VRID2, periodically exchange the SRP PDUs obtained from the participating Domain Master VLANs A and B (or C, D, etc.). When the parameter data obtained from the SRP PDUs indicates that it is necessary to elect a new master for a given virtual router VRID1 or VRID2 or any other virtual router that the SRP routers are supporting, an SRP election algorithm is performed to elect the new master SRP router accordingly.

For example, the parameter data may be in the form of priority field values which indicate the relative priority of one router over another for a given virtual router based on tracking environmental factors as described in an embodiment of commonly assigned application Method and Apparatus for Selecting Redundant Routers using Tracking, application Ser. No. 09/797,475. Other forms of parameter data may be obtained from the SRP PDUs without departing from the spirit of the invention.

At block 360, the newly elected master SRP router sends its subnet route for Domain Master VLANs A and B (and C, D, etc.) to all of the other routers, and commences default routing for all Domain Master VLANs A and B (and C, D, etc.) and associated VLAN member subnets once the old master SRP router times out.

Figure 4:
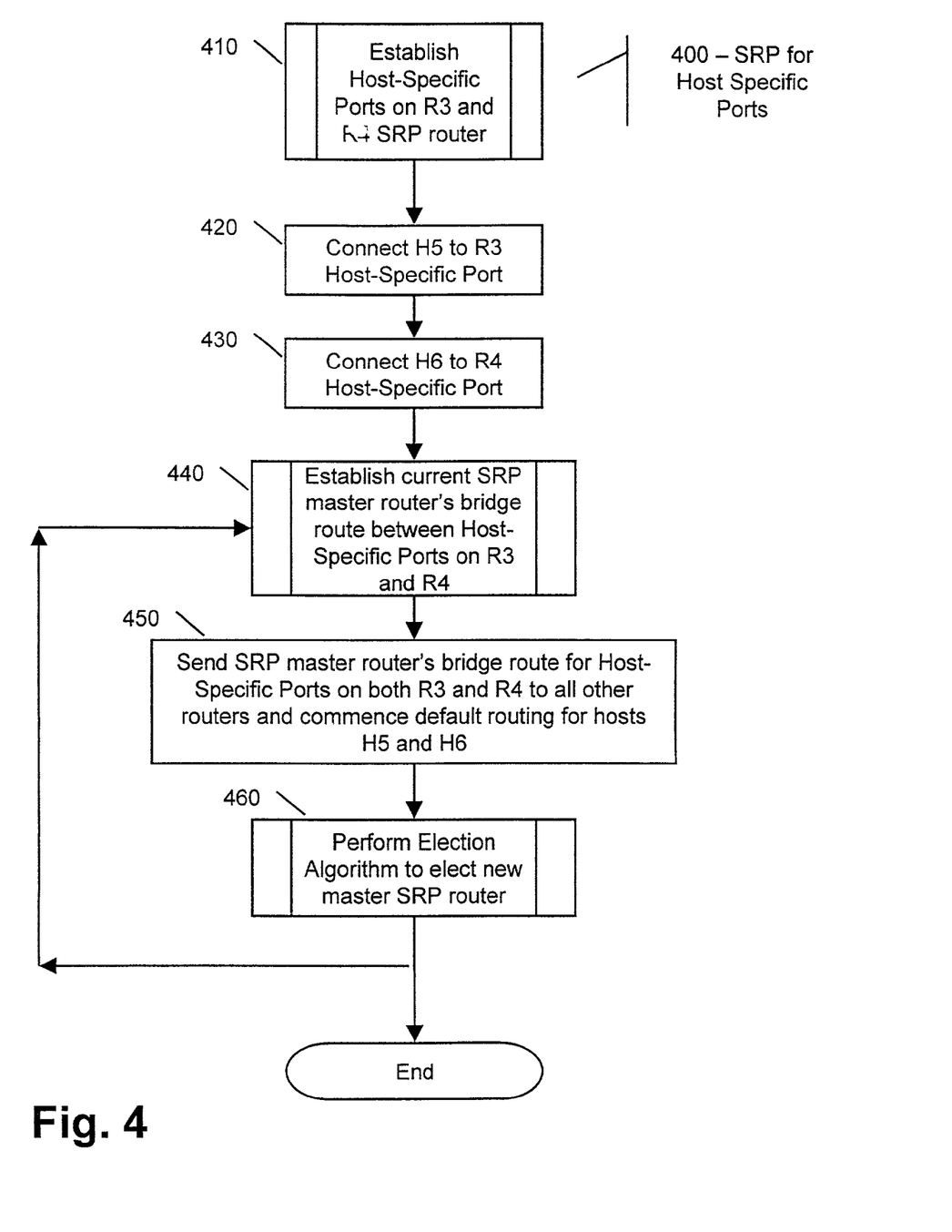
FIG. 4 illustrates a flow diagram of the participation in an SRP of an end-host connected to a host-specific port of an SRP router in accordance with one embodiment of the present invention.

Referring now to FIG. 4, wherein a flow diagram of the participation in an SRP of a Host Specific Port 400 in accordance with one embodiment of the present invention is shown. As illustrated, in block 410, the network administrator establishes end-hosts on host-specific ports 212/222 on the R3 and R4 SRP routers respectively. For example, the network administrator may assign end-host H5 to host-specific port 212 on R3 420, or end-host H6 to host-specific port 222 on R4 430. The end-hosts H5 and H6 are now able to participate in the SRP for a given virtual router, e.g. VRID1 and VRID2.

At block 440, the current SRP master router establishes a bridge route 226 from the host-specific port 212 on SRP router R3 210 to at least one other SRP router supporting the virtual routers VRID1 and VRID2, including router R4 220. Similarly, the current master router establishes a bridge route 226 from the host-specific port 222 on SRP router R4 220 to at least one other SRP router supporting the virtual routers VRID1 and VRID2, including router R4 220. At block 450, the SRP master router sends the bridge route 226 to all other routers and commences default routing for end-hosts H5 and H6. Eventually, at block 460, the virtual router which the current SRP master router is supporting performs an election algorithm to elect a new master SRP router. Block 440 is repeated to establish the new SRP master router's bridge route for the host-specific ports on the SRP routers R3 and R4 (or other SRP routers support the virtual router). Block 450 is also repeated to send the re-established bridge route 226 to all other routers and the new SRP master router commences default routing for end-hosts H5 and H6 attached to the host-specific ports 212/222. The SRP continues in this fashion over time to provide redundancy and a resulting high level of service to all end-hosts participating in the system, including those participating via the host-specific ports on the SRP routers themselves.

Accordingly, a novel method and system is described for a standby router protocol that provides increased participation in the SRP without a concomitant increase in the amount of SRP messaging and resulting network traffic. From the foregoing description, those skilled in the art will recognize that many other variations of the present invention are possible. In particular, while the present invention has been described as being implemented in a network comprising one or more routers R3 210 and R4 220, some of the logic may be distributed in other components of a network or inter-network application.

For example, embodiments of the invention may be represented as a software product stored on a machine-accessible medium (also referred to as a machine or computer-readable medium, or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for an SRP for Domain Master VLANs 300 and an SRP for Host-Specific Ports 400 can be stored on the machine-accessible medium. Those of ordinary skill in the art will appreciate that other instructions and operations necessary to implement the described invention may also be stored on the machine-accessible medium.

Thus, the present invention is not limited by the details described. Instead, the present invention can be practiced with modifications and alterations within the spirit and scope of the appended claims.

We claim:

1. A computer-implemented method for a standby router protocol (SRP) comprising:
   assigning a VLAN participating in an SRP to a membership in a VLAN domain, the VLAN domain having a master VLAN;
   establishing a default route for the membership of the VLAN domain as determined by a virtual router with which the master VLAN is associated;
   routing traffic for the VLAN in accordance with the domain master VLAN's default route;
   establishing a bridge route between physical SRP routers supporting the virtual router to provide a redundant network path for a physical end-host attached to a physical SRP router via a host-specific port; and
   sending an SRP message from one physical SRP router to another physical SRP router via the bridge route.

2. The method of claim 1, wherein establishing the default route is further determined by a current master of the virtual router.

3. The method of claim 1, further comprising re-establishing the default route for the membership of the VLAN domain as determined by a new master of the virtual router elected in accordance with the SRP.

4. The method of claim 1, wherein the SRP message is an Internet Protocol packet datagram unit (PDU).

5. The method of claim 4, wherein the PDU contains parameter data about a status of the end-host in a member VLAN.

6. The method of claim 4, wherein the PDU contains parameter data about a status of a member VLAN in the VLAN domain.

7. The method of claim 4, wherein the PDU contains parameter data about a status of the VLAN domain.

8. The method of claim 1, wherein the member VLAN is a layer-2 subnet.

9. The method of claim 1, wherein the domain master VLAN is a layer-2 subnet.

10. A computer-readable storage medium having instructions stored thereon that, when executed, cause a computer to:
    assign a VLAN participating in an SRP to a membership in a VLAN domain, the VLAN domain having a master VLAN;
    establish a default route for the membership of the VLAN domain as determined by a virtual router with which the master VLAN is associated;
    route traffic for the VLAN in accordance with the domain master VLAN's default route;
    establish a bridge route between physical SRP routers supporting the virtual router to provide a redundant network path for a physical end-host attached to a physical SRP router via a host-specific port; and
    send an SRP message from one physical SRP router to another physical SRP router via the bridge route.

11. The computer-readable storage medium of claim 10, comprising further instructions that cause the computer to:
    re-establish the default route for the membership of the VLAN domain as determined by a new master of the virtual router elected in accordance with the SRP.

12. The computer-readable storage medium of claim 10, wherein the SRP message is an Internet Protocol packet datagram unit (PDU).

13. The computer-readable storage medium of claim 12, wherein the PDU contains parameter data about a status of the end-host in a member VLAN.

14. The computer-readable storage medium of claim 12, wherein the PDU contains parameter data about a status of a member VLAN in the VLAN domain.

15. The computer-readable storage medium of claim 12, wherein the PDU contains parameter data about a status of the VLAN domain.

16. The computer-readable storage medium of claim 10, wherein the member VLAN is a layer-2 subnet.

17. The computer-readable storage medium of claim 10, wherein the domain master VLAN is a layer-2 subnet.

* * * * *

UNITED STATES PATENT AND TRADEMARK OFFICE
CERTIFICATE OF CORRECTION

| | |
|---|---|
| PATENT NO. | : 7,581,024 B1 |
| APPLICATION NO. | : 09/895145 |
| DATED | : August 25, 2009 |
| INVENTOR(S) | : Yip et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2517 days.

Signed and Sealed this

Fourteenth Day of September, 2010

David J. Kappos
*Director of the United States Patent and Trademark Office*